INVENTOR.
HUBERT E. TOBEY
BY Curtis Ailes
ATTORNEY

United States Patent Office 3,451,570
Patented June 24, 1969

3,451,570
CAKE DE-PANNER
Hubert E. Tobey, Rochelle Park, N.J., assignor to Continental Baking Company, Rye, N.Y., a corporation of Delaware
Continuation of application Ser. No. 575,313, Aug. 26, 1966. This application Aug. 28, 1968, Ser. No. 757,219
Int. Cl. B65g 65/42, 37/00; B65b 69/00
U.S. Cl. 214—311                                17 Claims

ABSTRACT OF THE DISCLOSURE

A cake de-panner having a first conveyor arranged to receive an inverted multiple-cavity baking pan having cakes in the cavities thereof. A second conveyor is provided in alignment with the first conveyor and having its entrance end spaced from the exit end of the first conveyor by a distance greater than the maximum width of one of the cakes and arranged to receive the leading edge of the baking pan. A third conveyor is arranged with its entrance end within the space between the first and second conveyors and extending at an angle beneath the second conveyor for the purpose of receiving and conveying cakes away from the associated cavities of the multiple-cavity pan. A double pulley device is provided in association with the third conveyor for turning the cakes over.

---

This is a continuation of patent application Serial No. 575,313 filed Aug. 26, 1966, now abandoned.

The present invention relates to an improved de-panning apparatus, and more particularly to improved apparatus for removing small cakes, such as cupcakes, from a large multiple-cavity baking pan.

The term "cake" is used in this specification in its broadest sense to mean virtually any bakery product such as bread, cupcakes, rolls, muffins, tarts, small pies, and the like.

In the production of cakes, one of the biggest problems is that of breakage or other damage resulting from treatment which is too rough in the process of removing the cakes from the baking pan and handling them to the point of packaging and shipment. While light, fluffy, delicate cakes are generally desirable from the standpoint of the consumer, unfortunately, these properties make the cakes difficult to handle and process, particularly at the delicate point of removal from the baking pan when they are still very, very fresh.

Accordingly, it is one object of the present invention to provide an improved cake de-panner which removes the cakes from the pan, while reducing the breakage and other mechanical damage otherwise experienced with the cakes.

Another object of the invention is to provide an improved apparatus for separating and removing small cakes from a multiple-cavity baking pan providing a reduced requirement for handling of the pan, such as lifting the pan, to separate the pan from the cakes.

Another problem frequently encountered in the de-panning portion of cake production is that the cakes are tipped or tilted in the de-panning step. This makes subsequent steps much more complicated, or may actually cause the product to be unmarketable. For instance, with cupcakes the application of frosting often is carried out after de-panning by automatic frosting machinery. If the cakes are tipped over, then the frosting machinery frosts the side of the cake. The resultant spoiled cake must be discarded.

Accordingly, it is another object of the invention to provide an improved cake de-panning apparatus which reduces the problem of mis-orientated cakes.

Another operation which often must be performed in conjunction with de-panning, or immediately thereafter, is a reversal of the position of the cakes. For instance, which cupcakes, the multiple-cavity pan is commonly turned upside down, and the cakes are removed from the pan by gravity, the cakes then all being upside down. If a frosting operation is next, and the frosting is to be placed on the top of the cakes, they must be inverted. A common method for accomplishing this has been to run the cakes over the exit end of a conveyor to the entrance end of another conveyor which is placed somewhat below the first conveyor so that the cakes simply tumble over onto their bottoms. The problem with this procedure is that, no matter how delicately the speeds of the conveyors, and the spacing between the conveyors, are adjusted, the "tumbling" of the cakes is necessarily somewhat erratic. Thus, a certain number of the cakes are always in the wrong orientation, and end up frosted on their sides or bottoms rather than on their tops.

Accordingly, it is another object of the present invention to provide an improved, dependable, cake reversal function in conjunction with the de-panning of the cakes.

Other objects and advantages of the invention will be apparent from the following description and the accompanying drawings.

In carrying out the invention in one preferred form thereof, there may be provided a cake de-panner including a first conveyor arranged to receive an inverted multiple-cavity baking pan having cakes in the cavities thereof. A second conveyor is arranged in alignment with the first conveyor and having the entrance end of its conveying surface arranged in substantially the same plane as the conveying surface of the first conveyor. The distance between the exit end of the first conveyor and the entrance end of the second conveyor is greater than the maximum width of one of the cakes, but less than one-half of the length of the multiple-cavity pan. The entrance end of the second conveyor is arranged to receive the leading edge of the inverted baking pan. A third conveyor is arranged within the space between the first and second conveyors. The entrance end of the third conveyor is positioned adjacent to the exit end of the first conveyor and has its conveying surface arranged in a plane extending at an angle to the first conveyor beneath the second conveyor for the purpose of supporting and conveying cakes away from the associated cavities of the multiple-cavity pan.

Figure 2:
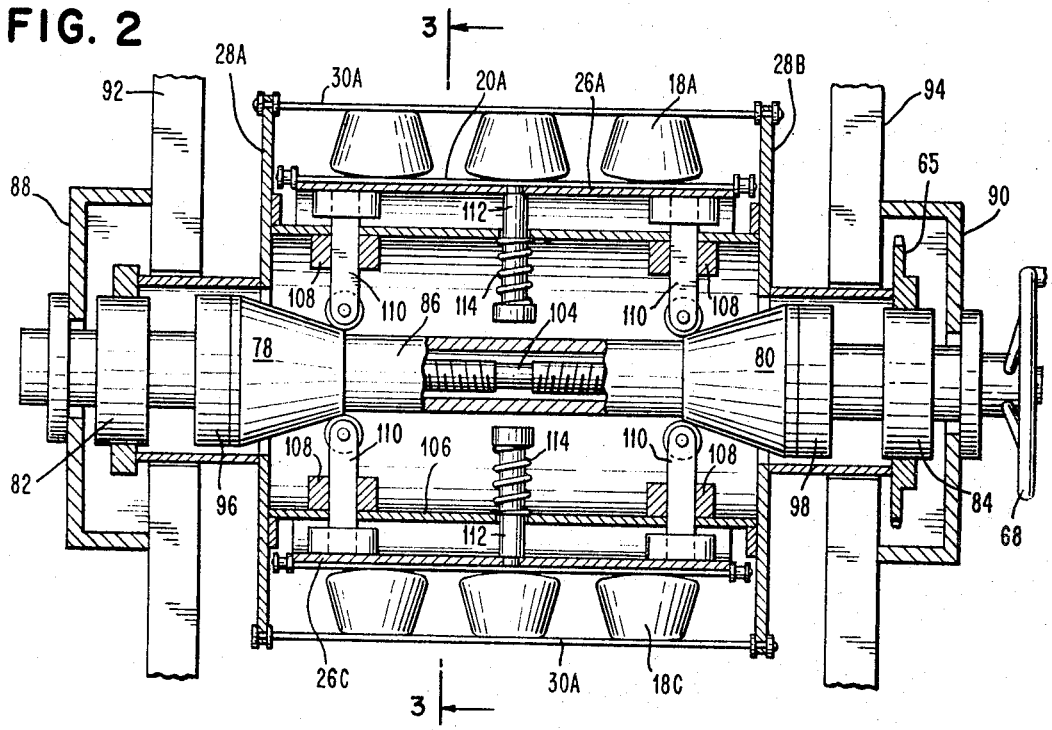
FIG. 2 is an enlarged detail view, partly in section, of a portion of the apparatus of FIG. 1 which performs a cake turn-over function.
Figure 3:
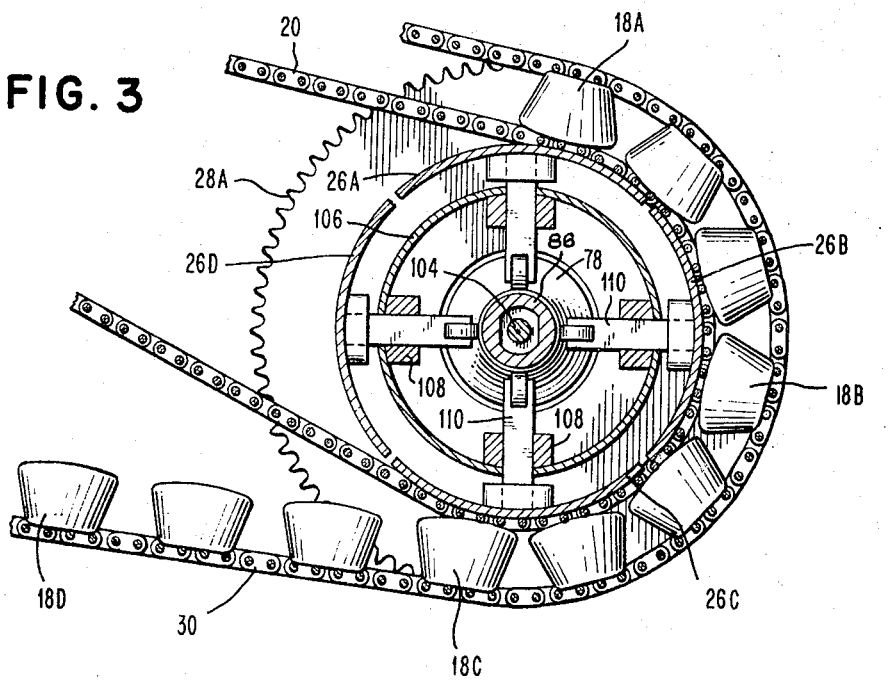

And FIG. 3 is a partial sectional view taken at section 3—3 of FIG. 2.

Figure 1:
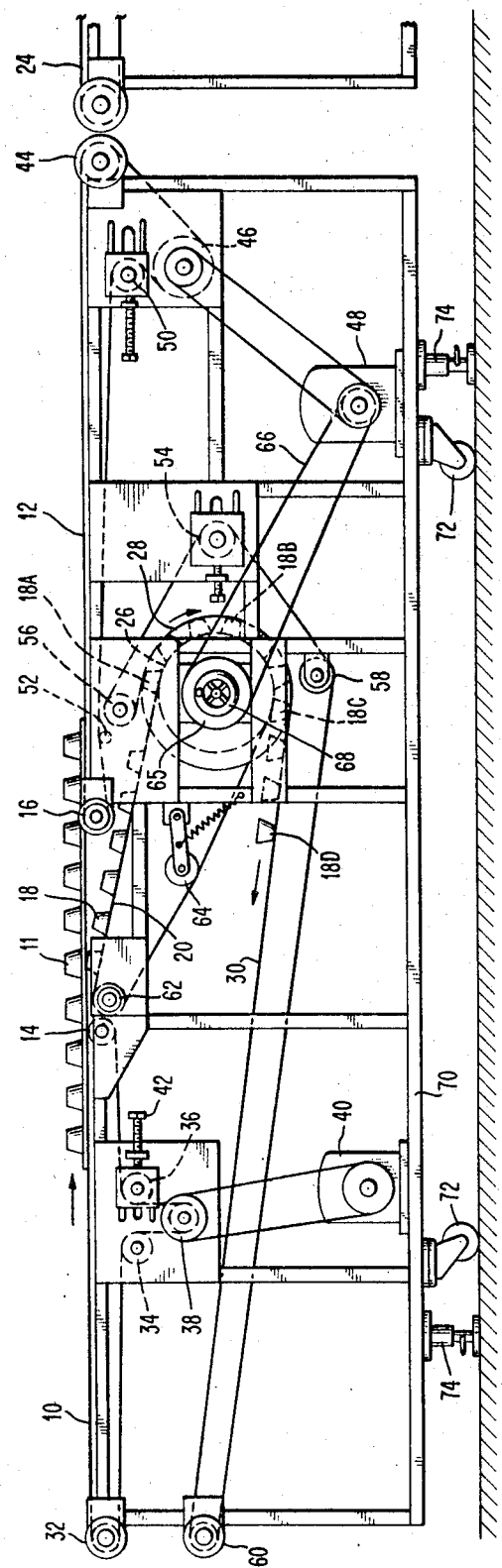
FIG. 1 is a side view of a preferred embodiment of apparatus in accordance with the present invention.

Referring more particularly to FIG. 1, there is shown a first conveyor 10 for receiving an inverted multiple-cavity baking pan 11 having cakes 18 in its cavities. A second conveyor 12 is arranged in alignment with the first conveyor 10. The exit end of the first conveyor 10 is defined by a conveyor pulley 14. Similarly, the entrance end of the second conveyor 12 is defined by a conveyor pulley 16. The space between the pulleys 14 and 16 is substantially larger than the maximum dimensions of the cakes 18 so that the cakes can be easily conveyed by means of a third conveyor 20 downwardly between the conveyors 10 and 12. The multiple-cavity baking pan 11 continues across the space between conveyors 10 and 12, and the leading edge is engaged and carried by the conveyor 12, preferably to a pan-washing machine conveyor 24.

The conveyor 20 passes over an inner pulley member 26 of a double pulley device which includes also an outer pulley member 28. Still another conveyor 30 is supported upon the outer pulley member 28. The radius of separation between conveyor 20 at the inner pulley member 26, and the conveyor 30 at the outer pulley member 28 is essentially equal to the height of the cakes 18. As shown by the cakes in the positions 18A, 18B and 18C, the cakes are gently but firmly held between the two conveyors 20 and 30 at the pulley members 26 and 28, and faultlessly turned right-side-up and then conveyed away by the conveyor 30 as indicated at 18D. At the exit end of the conveyor 30, the cakes may be passed on to additional processing apparatus such as frosting or packaging machinery. The preferred structure and operation of the double pulley device 26–28 will be described in more detail below in conjunction with FIGS. 2 and 3.

The conveyor 10 preferably includes a pulley 32 at its entrance end, several idler pulleys 34 and 36, and a drive pulley 38. Drive pulley 38 may be driven by a suitable motor 40. Idler pulley 36 may be made adjustable by an adjusting screw 42 to provide the proper amount of tension in the conveyor belt.

The conveyor 12 includes a pulley 44 at its exit end, a drive pulley 46 driven by a motor 48, a tension adjusting idler pulley 50, and an idler pulley 52. Motor 48 preferably drives the conveyor 12 at the same speed as the conveyor 10.

Conveyor 30 includes a tension adjusting idler pulley 54, idler pulleys 56 and 58, and an exit end pulley 60. The conveyor 20 includes an entrance end pulley 62, and a spring biased tension adjusting idler pulley 64.

It will be appreciated that there should not be a difference in relative rotational speeds between the conveyor 20 and the conveyor 30 at the inner and outer pulley members 26 and 28 of the double pulley device. Otherwise, there would be a consequent stress upon the individual cakes which are in engagement with both pulleys as they are being turned over. Accordingly, both of these conveyors 20 and 30 are preferably driven by the double pulley device 26–28 through a sprocket 65 and a drive chain 66 from the motor 48.

At the end hub of the frame of the apparatus at the double pulley device 26–28 there is an adjustment hand wheel 68 by means of which the radius of the inner pulley member 26 may be adjusted to accommodate for cakes of various heights. A preferred form of apparatus for accomplishing this result is shown and described in more detail in connection with FIGS. 2 and 3 below. The entire apparatus is conveniently supported upon a movable frame 70 mounted upon casters 72, and arranged to be anchored by built-in jacks 74 when set up for use.

It is apparent from the above description that the horizontal distance between the exit end of conveyor 10, as defined by the pulley 14, and the entrance end of conveyor 12, as defined by pulley 16, must be somewhat less than half of the length of the multiple-cavity pan 11 so that the leading edge of the pan will always bridge across the gap between these two conveyors rather than tilting down and traveling on the conveyor 20 beneath the conveyor 12. On the other hand, the distance between the exit end of conveyor 10 and the entrance end of conveyor 12 must obviously be substantially larger than the maximum dimension of the individual cakes 18 so that there will be plenty of room for the cakes to be conveyed downwardly through the gap and away from the pan 11.

As shown in this preferred embodiment of the invention, the conveying surface of the conveyor 20 is in a plane which is substantially tangent to the exit end pulley 14 of the conveyor 10. Since the speeds of the conveyors 10 and 20 are substantially the same, as an alternative feature, the conveyors 10 and 20 may be combined in a single conveyor, omitting the conveyor pulley 62 and utilizing the pulley 14 to define both the exit end of the portion of the combined conveyor represented by conveyor 10, and the entrance end of the portion of the combined conveyor defined by the present conveyor 20.

As another alternative, the end pulley 62 of conveyor 20 may be raised so that it is essentially tangent to the plane of the conveying surface of conveyor 10. In this position, idler pulley 62 essentially functions as an extension of the conveyor 10, particularly in reducing the effective gap between the exit end of conveyor 10 and the entrance end of conveyor 12. Thus, in such an embodiment, the pulley 62 defines the exit end of the conveyor 10 for purposes of measuring the gap to the entrance end of conveyor 12.

FIGS. 2 and 3 show details of a preferred structure for the double pulley device 26–28. The outer pulley member 28 includes two end sprocket wheels 28A and 28B across which the conveyor belt 30A is bridged and supported. The inner pulley member 26 is comprised of cylinder sectors 26A, B, C, and D, as best shown in FIG. 3. The conveyor 20, where it passes over the sectors such as 26A and 26B, bridges the gap between adjacent sectors as shown in FIG. 3, so that the inner pulley member 26 is essentially continuous as far as the cakes which are being handled are concerned. The sectors 26A, B, C, and D are capable of radial outward adjustment for the purpose of varying the effective diameter of the inner pulley member 26. The structure for accomplishing this adjustment is most clearly illustrated in FIG. 2, and it includes cone members 78 and 80 which are arranged for concurrent axial adjustment movement towards, or away from, the center of the structure in response to rotation of the adjustment hand wheel 68.

In FIG. 2, the cones 78 and 80 are shown in their outermost axial positions providing for the completely retracted position of the segments 26A, B, C, and D. This provides the minimum effective diameter for the inner pulley member 26, and the maximum spacing between the conveyor 20 and the conveyor 30 as they pass over the double pulley 26–28.

The inner and outer pulley members 26–28 and the assembled components thereof are supported for rotation upon bearings 82 and 84. The common drive sprocket 65 forms part of the outer rotatable portion of bearing 84. The central, non-rotatable, portions of the bearings 82 and 84 are supported upon a non-rotating spindle member 86 which extends all the way through the apparatus and is supported at each end by spindle brackets 88 and 90, which in turn are mounted upon machine frame members 92 and 94 respectively.

The cone members 78 and 80 are each provided with independent rotational bearing supports upon the spindle 86, as indicated at 96 and 98. The cone members 78 and 80, and the associated bearings 96 and 98, are axially movable by means of threaded units (not shown) which engage with an adjusting screw 104 extending through the hollow center bore of the spindle 86. The adjusting wheel 68 is fixed to the end of the adjusting screw 104 for adjusting rotation thereof. As indicated in the sectioned central portion of the spindle 86, the threads of the adjusting screw 104 are "left-hand" at one end, and "right-hand" at the other end so that rotation in either direction will always cause movement of the cone members 78 and 80 either towards the center, or away from the center of the apparatus. As shown in FIG. 3, the center bore of the spindle 86 is not circular in cross-section. Instead, it has a special shape which cooperates with the threaded nuts so that the nuts do not rotate with the adjusting screw, but rather are axially movable in response to rotation of the screw. The threaded nuts are connected to the cone bearings 96 and 98 by means of connecting straps (not shown) which extend from the nuts outwardly through slots in the spindle 86. Structures which are suitable for the spindle 86, the adjusting screw 104, the threaded nuts, and the bearings for cones 78 and 80 are commercially available from American Machine and Foundry Company (AMF), 261 Madison Ave., New York, N.Y. 10016, under the AMF catalog numbers 3-126-25331, 25337, 25338, and 25339.

The supporting structure for the variable radius segments 26A, B, C, and D includes a bearing tube 106, which is supported and fastened upon the end sprockets 28A and 28B. Bearing tube 106 includes integral plunger bearings 108. A plunger 110 is provided at each axial end of each of the segments 26A, B, C, and D and arranged for radial movement within the associated plunger bearings 108 whenever such movement is called for by adjustment movement of the cone members 78 and 80. As shown in the drawings, the plunger members 110 are each provided with rollers for engagement with the cone members to reduce the transverse forces upon the plungers 110 and to thereby reduce the wear at the plunger bearing members 108.

In order to further stabilize the positions of the segments 26A, B, C, and D, each segment is provided with an integral pin member 112 which extends through an opening in the cylindrical bearing tube 106, and which includes a compression spring 114 biasing the associated segment towards the minimum radius position and keeping it from rattling when it is not engaged by the belt 20.

It will be apparent that mechanisms other than the screw driven cones 78 and 80 may be employed for the purpose of expanding the radius of each of the segments 26A, B, C, and D to change the effective radius of the inner pulley member 26. Many suitable mechanisms are known. For instance, a mechanism similar to a "scissors" jack may be adapted to this purpose.

As previously mentioned above, the conveyor belt 30A of the conveyor 30 bridges across between the pulley sprocket wheels 28A and 28B. This is clearly shown in FIG. 2. In order to accomplish this bridging function, the conveyor belt 30A is preferably relatively inflexible in a transverse direction, and flexible in a longitudinal direction. For this purpose, a suitable structure has been found to be composed of transversely arranged metal rods joined at the edge portions of the belt 30A by means of chain links which are similar to those used for bicycle chains. Thus, the edges of the belt structure comprise more or less conventional link chains, and the transverse metal rods serve as the pivot pins of these chains. The tension forces in the belt structure are all taken by the link chains at the edges of the belt, and the belt structure is relatively inflexible in a transverse direction because of the stiffness of the metal rods. The metal rods also provide the useful advantage that they are easily cleaned. The belt 20A of conveyor 20 is narrower than the belt 30A so that it can fit between the sprocket members 28A and 28B.

While this invention has been shown and described in connection with a single preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

What is claimed is:

1. A cake de-panner comprising a first conveying means having a substantial horizontal supporting span arranged to receive an inverted multiple-cavity baking pan having cakes in the cavities thereof, a second conveying means arranged in alignment with said first conveying means and having at least the edge of the entrance end of the conveying surface thereof arranged in substantially the same plane as the conveying surface of said first conveying means, said first and second conveying means being separated by a substantial dimension between the exit end of said first conveying means and the entrance end of said second conveying means, the entrance end of said second conveying means being arranged to receive the leading edge of the inverted baking pan when said first and second conveying means are in operation, and a third conveying means arranged within the space between said first and second conveying means and having its entrance end positioned at the exit end of said first conveying means and having a moving conveying surface arranged in a plane extending downwardly at an angle to said first conveying means and beneath the plane of said second conveying means for the purpose of supporting and conveying cakes away from the associated cavities of the multiple-cavity pan while maintaining the cakes in a stable position upon said third conveying means, said dimension between said exit end of said first conveying means and said entrance end of said second conveying means being at least sufficient to provide a safe clearance from said second conveying means for the cakes positioned upon said third conveying means.

2. Apparatus in accordance with claim 1 in which each of said conveying means comprises a separate conveyor.

3. Apparatus in accordance with claim 1 wherein there is provided in combination a pan-washing machine arranged in alignment with said second conveying means to receive empty pans to be washed.

4. A cake de-panner comprising a first conveying means arranged to receive an inverted multiple-cavity baking pan having cakes in the cavities thereof, a second conveying means arranged in alignment with said first conveying means and having at least the edge of the entrance end of the conveying surface thereof arranged in substantially the same plane as the conveying surface of said first conveying means, said first and second conveying means being separated by a distance between the exit end of said first conveying means and the entrance end of said second conveying means equal to a dimension greater than the maximum width of one of the cakes but less than one-half of the length of the multiple-cavity pan, the entrance end of said second conveying means being arranged to receive the leading edge of the inverted baking pan when said first and second conveying means are in operation, and a third conveying means arranged within the space between said first and second conveying means and having its entrance end positioned at the exit end of said first conveying means and having a conveying surface arranged in a plane extending at an angle to said first conveying means beneath said second conveying means for the purpose of supporting and conveying cakes away from the associated cavities of the multiple-cavity pan, a double pulley device mounted for rotation on a spindle, said double pulley device including concentric and axially aligned inner and outer pulley members, the difference in radius between said inner pulley member and said outer pulley member corresponding generally to the height dimension of the cakes being handled, a fourth conveying means arranged for operation over one of said double pulley members, said third conveying means being arranged for operation in conjunction with the other one of said double pulley members, said double pulley device being operable in conjunction with the associated conveying means to engage the cakes between the inner and outer members of said double pulley device through a semi-circular path to thereby turn over each of said cakes.

5. Apparatus in accordance with claim 4 wherein said inner pulley member constitutes an end pulley of said third conveyor and in which said outer pulley member constitutes a pulley of said fourth conveyor, the cakes being conveyed downwardly in the semi-circular turnover operation and being transferred from said third conveyor to said fourth conveyor in the course of the turnover operation.

6. A cake de-panner in accordance with claim 5 wherein said third and fourth conveyors are both driven by a common driving means through said double pulley device.

7. Apparatus in accordance with claim 5 wherein said fourth conveyor comprises a belt-like structure which is relatively inflexible in a transverse direction and relatively flexible in a longitudinal direction, said belt-like structure being supported at its outer edges on said outer pulley device, said third conveyor comprising a belt-like bridge across the axially central portion of said double pulley device, said third conveyor comprising a belt-like structure which engages said inner pulley member only within said axially central portion of said double pulley device.

8. Apparatus in accordance with claim 5 wherein said double pulley device includes a variable diameter feature such that the diameter of one of said pulley members is adjustable with respect to the other in order to accommodate for cakes of various height dimensions.

9. Apparatus in accordance with claim 8 wherein said variable diameter member in said inner pulley member and in which the variable diameter feature is carried out by providing said inner pulley member with separate arcuate sectors which are radially adjustable in and out to establish different diameters, the belt portion of said third conveyor being caused to bridge over the openings between said arcuate sectors.

10. Apparatus in accordance with claim 9 wherein there is a structure in which said inner pulley member sectors are radially movable by the provision of at least one axially movable cone member which is arranged to engage said sectors to cause a radial outward adjustment thereof in response to axial movement of said cone member.

11. Apparatus in accordance with claim 10 wherein at least two of said cone members are provided for engagement with opposite axial edge portions of each of said variable diameter pulley sectors, said cone members being oppositely arranged on the axis of said double pulley to provide for the diameter varying adjustment by coordinated axial movement of said cone members toward and away from the axial center of said double pulley device.

12. A cake de-panner comprising a first conveying means arranged to receive an inverted multiple-cavity baking pan having cakes in the cavities thereof, a second conveying means having an entrance end arranged in alignment with the exit end of said first conveying means, the exit end of said first conveying means and the entrance end of said second conveying means being separated by a substantial dimension to permit the cakes to pass downwardly through the separation, the entrance end of said second conveying means being arranged to receive the leading edge of the inverted baking pan, a third conveying means having its entrance end positioned at the exit end of said first conveying means and between said exit end of said first conveying means and said entrance end of said second conveying means, said third conveying means having a conveying surface arranged in a plane extending downwardly at an angle from said exit end of said first conveying means for the purpose of supporting and conveying cakes away from the associated cavities of the multiple-cavity pan, substantially concentric and axially aligned inner and outer pulley members, the difference in radius between said inner pulley member and said outer pulley member corresponding generally to the height dimension of the cakes being handled, said inner pulley member comprising an end pulley of said third conveying means, a fourth conveying means arranged for operation over said outer pulley member, said inner and outer pulley members being operable at the same rotational speed and in conjunction with the associated conveying means to engage the cakes between said inner and outer pulley members to move said cakes through a semi-circular path to thereby turn over each of said cakes.

13. A cake de-panner in accordance with claim 12 wherein said third and fourth conveyors are both driven by a common driving means.

14. Apparatus in accordance with claim 12 wherein said fourth conveyor comprises a belt-like structure which is relatively inflexible in a transverse direction and relatively flexible in a longitudinal direction, said belt-like structure being supported at its outer edges on said outer pulley member so as to bridge across the axially central portion of said inner pulley member, said third conveyor comprising a belt-like structure which engages said inner pulley member only within said axially central portion thereof.

15. Apparatus in accordance with claim 12 wherein one of said pulley members is radially adjustable with respect to the other at least at the arcuate portion thereof operable in conjunction with the associated conveying means for engagement with the cakes in order to accommodate for cakes of various height dimensions.

16. Apparatus in accordance with claim 13 wherein said fourth conveyor includes idler pulleys generally arranged around said double pulley device for carrying the return portion of said fourth conveyor around the outside of said outer pulley member.

17. Apparatus in accordance with claim 14 wherein said belt-like structure of said fourth conveyor comprises transversely arranged metal rods which are longitudinally connected in an articulated spaced relationship with one another by means of a chain-like linkage at each side edge of said structure, each end of each of said rods being connected to said chain-like linkages.

References Cited

UNITED STATES PATENTS

| | | | |
|---|---|---|---|
| 2,323,852 | 7/1943 | Seidel et al. | 214—304 |
| 3,044,642 | 7/1962 | Bycer et al. | 214—304 |
| 3,310,187 | 3/1967 | Barker et al. | 214—311 X |

HUGO O. SCHULZ, *Primary Examiner.*

PO-1050
(5/69)

UNITED STATES PATENT OFFICE
CERTIFICATE OF CORRECTION

Patent No. 3,451,570          Dated June 24, 1969

Inventor(s)        HUBERT E. TOBEY

It is certified that error appears in the above-identified patent and that said Letters Patent are hereby corrected as shown below:

Column 2, line 4, "which" should read --with--.
Column 4, line 53, "units" should read --nuts--.
Column 7, line 4, "device, said third conveyor comprising a belt-like" should read --member of said double pulley device so as to--;
        line 16, "in" should read --is--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents